US012748556B2

(12) United States Patent
Dayacap et al.

(10) Patent No.: US 12,748,556 B2
(45) Date of Patent: Sep. 29, 2026

(54) INTERLEAVING FOGGY-FINE PROGRAMMING IN MEMORY DEVICES

(71) Applicant: SK Hynix NAND Product Solutions Corp., Rancho Cordova, CA (US)

(72) Inventors: Justin R. Dayacap, Folsom, CA (US); Sarvesh Varakabe Gangadhar, Milpitas, CA (US); David B. Carlton, Pleasanton, CA (US); Mark Anthony Golez, Folsom, CA (US)

(73) Assignee: SK Hynix NAND Product Solutions Corp., Rancho Cordova, CA (US)

( * ) Notice: Subject to any disclaimer, the term of this patent is extended or adjusted under 35 U.S.C. 154(b) by 0 days.

(21) Appl. No.: 18/909,805

(22) Filed: Oct. 8, 2024

(65) Prior Publication Data

US 2026/0099272 A1 Apr. 9, 2026

(51) Int. Cl.
*G06F 3/06* (2006.01)

(52) U.S. Cl.
CPC .......... *G06F 3/0659* (2013.01); *G06F 3/0611* (2013.01); *G06F 3/0656* (2013.01); *G06F 3/0679* (2013.01)

(58) Field of Classification Search
CPC .... G06F 3/0659; G06F 3/0611; G06F 3/0656; G06F 3/0679
USPC .................................................. 711/154, 100
See application file for complete search history.

(56) References Cited

U.S. PATENT DOCUMENTS

| | | | |
|---|---|---|---|
| 11,437,104 B2 | 9/2022 | Sharma et al. | |
| 2011/0239088 A1* | 9/2011 | Post .................... | G06F 11/1068 714/763 |
| 2012/0055166 A1 | 3/2012 | John et al. | |
| 2017/0068482 A1* | 3/2017 | Ramalingam ....... | G06F 12/0868 |
| 2019/0311772 A1* | 10/2019 | Diep ...................... | G11C 16/08 |
| 2021/0149797 A1 | 5/2021 | Kanno et al. | |
| 2022/0365717 A1* | 11/2022 | Mukhopadhyay .... | G06F 3/0656 |
| 2024/0004565 A1 | 1/2024 | Ji et al. | |
| 2024/0221802 A1 | 7/2024 | Venugopal | |

OTHER PUBLICATIONS

SK Hynix NAND Product Solutions Corp. (dba Solidigm), PCT/US2025/049270, International Search Report and Written Opinion, Jan. 30, 2026, 7 pgs.

* cited by examiner

*Primary Examiner* — Hosain T Alam
*Assistant Examiner* — Zubair Ahmed
(74) *Attorney, Agent, or Firm* — Morgan, Lewis & Bockius LLP

(57) ABSTRACT

This application is directed to managing memory write operations in a memory system. The memory system includes a controller and non-volatile memory storing data, and the non-volatile memory further includes a first memory block and a second memory block. The memory system successively performs a first batch of foggy programming operations on a plurality of first memory pages located at an end of the first memory block, and opens the second memory block having a plurality of second memory pages located at a start of the second memory block. After the first batch of foggy programming operations, the memory system alternatingly performs a first batch of fine programming operations on the plurality of first memory pages and a second batch of foggy programming operations on the plurality of second memory pages.

19 Claims, 9 Drawing Sheets

INTERLEAVING FOGGY-FINE PROGRAMMING IN MEMORY DEVICES

TECHNICAL FIELD

This application relates generally to computer memory technology including, but not limited to, methods, systems, and non-transitory computer-readable media for programming memory blocks of a memory system that stores multiple data bits per memory cell.

BACKGROUND

Memory is applied in a computer system to store instructions and data. The data are processed by one or more processors of the computer system according to the instructions stored in the memory. Multiple memory units are used in different portions of the computer system to serve different functions. Specifically, the computer system includes non-volatile memory that acts as secondary memory to keep data stored thereon if the computer system is decoupled from a power source. Examples of the secondary memory include, but are not limited to, hard disk drives (HDDs) and solid-state drives (SSDs). The secondary memory relies on a storage controller to manage its memory space and process read, write, and read-modify-write requests from a host device efficiently with low latency. If programmed with desirable threshold voltages, memory cells of SSDs (e.g., NAND flash memory) can exist in multiple possible states and store multiple bits of data per memory cell. Foggy programming and fine programming are interleaved to write data into a memory band of a NAND flash memory, which oftentimes causes a memory system that stores multiple data bits per cell to fail requirements associated with quality of service (QoS) and input/output operations per second (IOPS).

SUMMARY

Various embodiments of this application are directed to methods, systems, devices, and non-transitory computer-readable media for writing data into a memory system by performing coarse and fine programming operations on memory blocks (e.g., two memory bands) that store two or more data bits per memory cell. The two memory blocks may be programmed partially concurrently (e.g., in an interleaving manner). In some embodiments, when the memory system is programming a first memory block, a second memory block is opened for data programming before the first memory block is closed. For example, the memory system may perform an early destination band open, before a current memory band is closed. The current memory band and a next destination band that is opened earlier are opened concurrently for data programming and stitched to one another. In an example, the memory system starts a first batch of nine foggy programming operations on the next destination band following the current memory band, while completing a last batch of nine fine programming operations of the current memory band (e.g. to make programming operations symmetric). By these means, some implementations of the present disclosure can satisfy QoS and IOPS requirements (e.g., requirements for write QoS or IOPs stability).

In one aspect, a method for managing memory write operations is implemented at a memory system including a controller and non-volatile memory storing data. The non-volatile memory further includes a first memory block and a second memory block. The method includes successively performing a first batch of foggy programming operations on a plurality of first memory pages located at an end of the first memory block and opening the second memory block having a plurality of second memory pages located at a start of the second memory block. The method further includes, after the first batch of foggy programming operations, alternatingly, performing a first batch of fine programming operations on the plurality of first memory pages and performing a second batch of foggy programming operations on the plurality of second memory pages.

In some embodiments, each first memory page is uniquely associated with a respective second memory page. The method further includes, for each first memory page, performing a respective one of the first batch of fine programming operations on the respective first memory page. The method further includes performing a respective one of the second batch of foggy programming operations on the respective second memory page, immediately after the respective one of the first batch of fine programming operations and without being separated by a distinct foggy or fine programming operation.

In some embodiments, each first memory page is uniquely associated with a respective second memory page. The method further includes, for each second memory page, performing a respective one of the second batch of foggy programming operations on the respective second memory page. The method further includes performing a respective one of the first batch of fine programming operations on the respective first memory page, immediately after the respective one of the second batch of foggy programming operations and without being separated by a distinct foggy or fine programming operation.

In some embodiments, the non-volatile memory includes a quad-level cell (QLC) solid state drive, and each QLC memory cell of the non-volatile memory is configured to be written with data via two successive programming operations including a respective foggy programming operation followed by a respective fine programming operation.

In some embodiments, the non-volatile memory is one of a single-level cell (SLC) solid state drive (SSD), a multi-level cell (MLC) SSD, a triple-level cell (TLC) SSD, a quad-level cell (QLC) SSD, and a penta-level cell (PLC) SSD. In some embodiments, the non-volatile memory is an X-level cell, where X is an integer greater than 5.

In another aspect, some implementations include a memory system (e.g., SSDs) or a memory device (e.g., SSD) having a controller, a non-volatile memory storing data, and memory storing one or more programs for execution by the controller. The non-volatile memory has instructions stored thereon for performing any of the above methods for managing memory write operations.

In yet another aspect, some implementations include a non-transitory computer readable storage medium storing one or more programs. The one or more programs include instructions, which when executed by a memory system (e.g., SSDs) or a memory device (e.g., a SSD) cause the memory system or the memory device to implement any of the above methods for managing memory write operations.

These illustrative embodiments and implementations are mentioned not to limit or define the disclosure, but to provide examples to aid understanding thereof. Additional embodiments are discussed in the Detailed Description, and further description is provided there.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

Like reference numerals refer to corresponding parts throughout the several views of the drawings.

DETAILED DESCRIPTION

Reference will now be made in detail to specific embodiments, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with storage capabilities.

Figure 1:
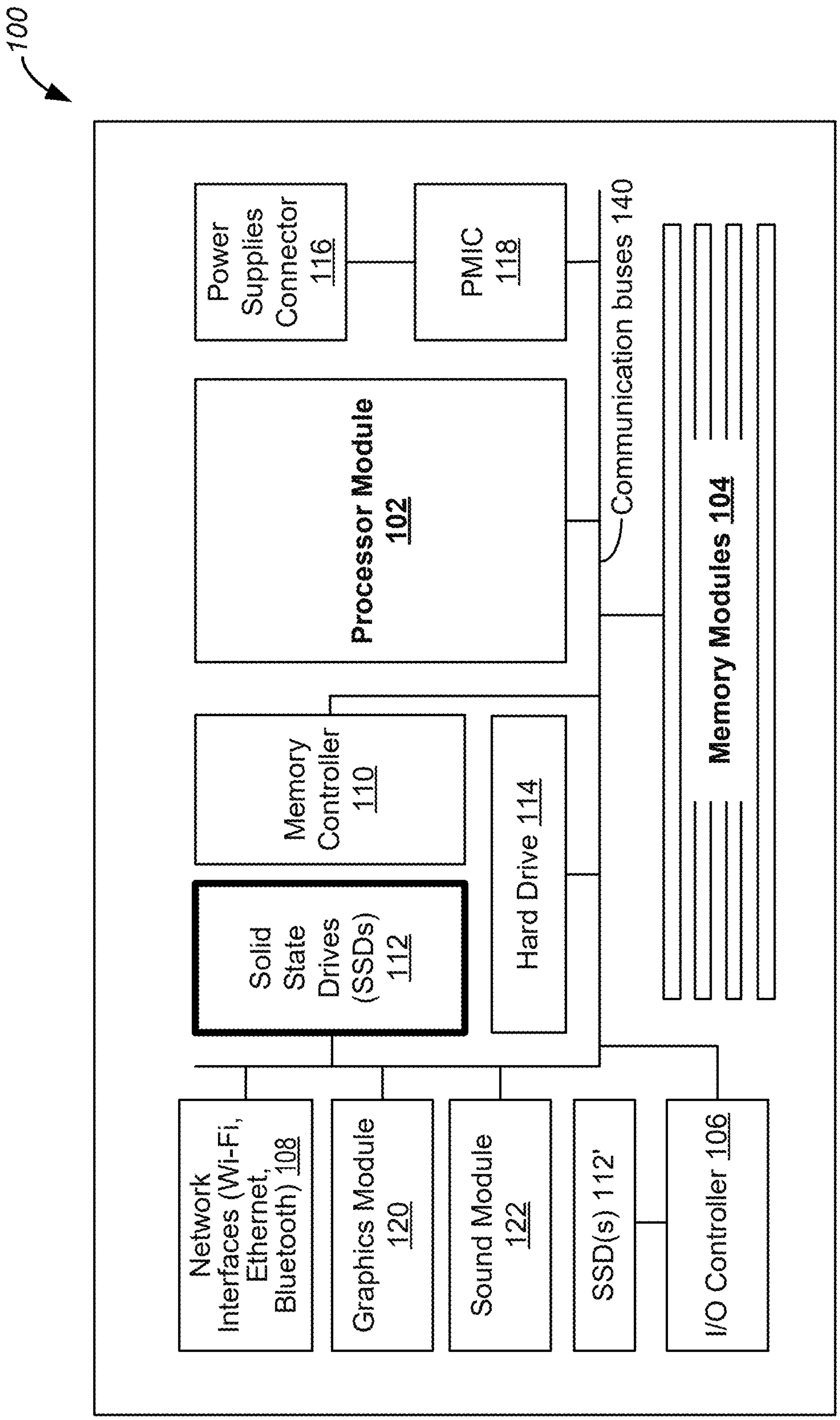
FIG. 1 is a block diagram of an example system module in a typical electronic device in accordance with some embodiments.

FIG. 1 is a block diagram of an example system module 100 in a typical electronic system in accordance with some embodiments. The system module 100 in this electronic system includes at least a processor module 102, memory modules 104 for storing programs, instructions and data, an input/output (I/O) controller 106, one or more communication interfaces such as network interfaces 108, and one or more communication buses 140 for interconnecting these components. In some embodiments, the I/O controller 106 allows the processor module 102 to communicate with an I/O device (e.g., a keyboard, a mouse or a trackpad) via a universal serial bus interface. In some embodiments, the network interfaces 108 includes one or more interfaces for Wi-Fi, Ethernet and Bluetooth networks, each allowing the electronic system to exchange data with an external source, e.g., a server or another electronic system. In some embodiments, the communication buses 140 include circuitry (sometimes called a chipset) that interconnects and controls communications among various system components included in system module 100.

In some embodiments, the memory modules 104 include high-speed random-access memory, such as static random-access memory (SRAM), double data rate (DDR) dynamic random-access memory (DRAM), or other random-access solid state memory devices. In some embodiments, the memory modules 104 include non-volatile memory, such as one or more magnetic disk storage devices, optical disk storage devices, flash storage devices, or other non-volatile solid state storage devices. In some embodiments, the memory modules 104, or alternatively the non-volatile storage device(s) within the memory modules 104, include a non-transitory computer readable storage medium. In some embodiments, memory slots are reserved on the system module 100 for receiving the memory modules 104. Once inserted into the memory slots, the memory modules 104 are integrated into the system module 100.

In some embodiments, the system module 100 further includes one or more components selected from a memory controller 110, SSD(s) 112, an HDD 114, power management integrated circuit (PMIC) 118, a graphics module 120, and a sound module 122. The memory controller 110 is configured to control communication between the processor module 102 and memory components, including the memory modules 104, in the electronic system. The SSD(s) 112 are configured to apply integrated circuit assemblies to store data in the electronic system, and in many embodiments, are based on NAND or NOR memory configurations. The HDD 114 is a conventional data storage device used for storing and retrieving digital information based on electromechanical magnetic disks. The power supply connector 116 is electrically coupled to receive an external power supply. The PMIC 118 is configured to modulate the received external power supply to other desired DC voltage levels, e.g., 5V, 3.3V or 1.8V, as required by various components or circuits (e.g., the processor module 102) within the electronic system. The graphics module 120 is configured to generate a feed of output images to one or more display devices according to their desirable image/video formats. The sound module 122 is configured to facilitate the input and output of audio signals to and from the electronic system under control of computer programs.

Alternatively or additionally, in some embodiments, the system module 100 further includes SSD(s) 112' coupled to the I/O controller 106 directly. Conversely, the SSDs 112 are coupled to the communication buses 140. In an example, the communication buses 140 operates in compliance with Peripheral Component Interconnect Express (PCIe or PCI-E), which is a serial expansion bus standard for interconnecting the processor module 102 to, and controlling, one or more peripheral devices and various system components including components 110-122.

Further, one skilled in the art knows that other non-transitory computer readable storage media can be used, as new data storage technologies are developed for storing information in the non-transitory computer readable storage media in the memory modules 104, SSD(s) 112 or 112', and HDD 114. These new non-transitory computer readable storage media include, but are not limited to, those manufactured from biological materials, nanowires, carbon nanotubes and individual molecules, even though the respective data storage technologies are currently under development and yet to be commercialized.

Figure 2:
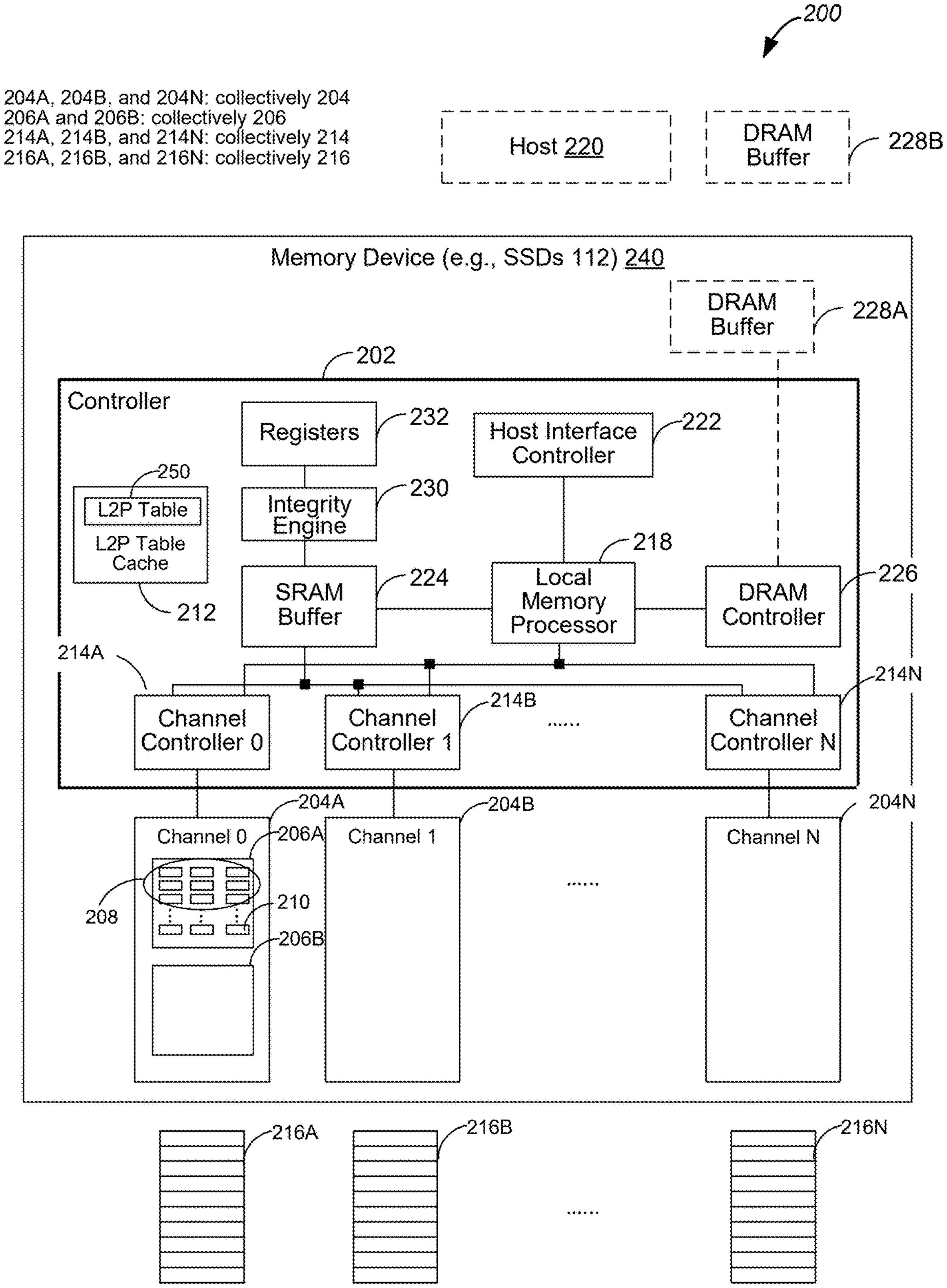
FIG. 2 is a block diagram of a memory system of an example electronic device having one or more memory access queues, in accordance with some embodiments.

FIG. 2 is a block diagram of a memory system 200 of an example electronic device having one or more memory access queues, in accordance with some embodiments. The memory system 200 is coupled to a host device 220 (e.g., a processor module 102 in FIG. 1) and configured to store instructions and data for an extended time, e.g., when the electronic device sleeps, hibernates, or is shut down. The host device 220 is configured to access the instructions and data stored in the memory system 200 and process the instructions and data to run an operating system (OS) and execute user applications. The memory system 200 includes one or more memory devices 240 (e.g., SSD(s)). Each memory device 240 further includes a controller 202 and a plurality of memory channels 204 (e.g., channel 204A, 204B, and 204N). Each memory channel 204 includes a plurality of memory cells. The controller 202 is configured to execute firmware level software to bridge the plurality of memory channels 204 to the host device 220. In some embodiments, each memory device 240 is formed on a printed circuit board (PCB).

Each memory channel 204 includes on one or more memory packages 206 (e.g., two memory dies). In an example, each memory package 206 (e.g., memory package 206A or 206B) corresponds to a memory die. Each memory package 206 includes a plurality of memory planes 208, and each memory plane 208 further includes a plurality of memory pages 210. Each memory page 210 includes an ordered set of memory cells, and each memory cell is identified by a respective physical address. In some embodiments, the memory device 240 includes a plurality of superblocks. Each superblock includes a plurality of memory blocks each of which further includes a plurality of memory pages 210. For each superblock, the plurality of memory blocks are configured to be written into and read from the memory system via a memory input/output (I/O) interface concurrently. Optionally, each superblock groups memory cells that are distributed on a plurality of memory planes 208, a plurality of memory channels 204, and a plurality of memory dies 206. In an example, each superblock includes at least one set of memory pages, where each page is distributed on a distinct one of the plurality of memory dies 206, has the same die, plane, block, and page designations, and is accessed via a distinct channel of the distinct memory die 206. In another example, each superblock includes at least one set of memory blocks, where each memory block is distributed on a distinct one of the plurality of memory dies 206 includes a plurality of pages, has the same die, plane, and block designations, and is accessed via a distinct channel of the distinct memory die 206. The memory device 240 stores information of an ordered list of superblocks in a cache of the memory device 240. In some embodiments, the cache is managed by a host driver of the host device 220, and called a host managed cache (HMC).

In some embodiments, the memory device 240 includes a single-level cell (SLC) NAND flash memory chip, and each memory cell stores a single data bit. In some embodiments, the memory device 240 includes a multi-level cell (MLC) NAND flash memory chip, and each memory cell of the MLC NAND flash memory chip stores 2 data bits. In an example, each memory cell of a triple-level cell (TLC) NAND flash memory chip stores 3 data bits. In another example, each memory cell of a quad-level cell (QLC) NAND flash memory chip stores 4 data bits. In yet another example, each memory cell of a penta-level cell (PLC) NAND flash memory chip stores 5 data bits. In yet another example, each memory cell stores more than 5 data bits. In some embodiments, each memory cell can store any suitable number of data bits. Compared with the non-SLC NAND flash memory chips (e.g., MLC SSD, TLC SSD, QLC SSD, PLC SSD), the SSD that has SLC NAND flash memory chips operates with a higher speed, a higher reliability, and a longer lifespan, and however, has a lower device density and a higher price.

Each memory channel 204 is coupled to a respective channel controller 214 (e.g., controller 214A, 214B, or 214N) configured to control internal and external requests to access memory cells in the respective memory channel 204. In some embodiments, each memory package 206 (e.g., each memory die) corresponds to a respective queue 216 (e.g., queue 216A, 216B, or 216N) of memory access requests. In some embodiments, each memory channel 204 corresponds to a respective queue 216 of memory access requests. Further, in some embodiments, each memory channel 204 corresponds to a distinct and different queue 216 of memory access requests. In some embodiments, a subset (less than all) of the plurality of memory channels 204 corresponds to a distinct queue 216 of memory access requests. In some embodiments, all of the plurality of memory channels 204 of the memory device 240 correspond to a single queue 216 of memory access requests. Each memory access request is optionally received internally from the memory device 240 to manage the respective memory channel 204 or externally from the host device 220 to write or read data stored in the respective channel 204. Specifically, each memory access request includes one of: a system write request that is received from the memory device 240 to write to the respective memory channel 204, a system read request that is received from the memory device 240 to read from the respective memory channel 204, a host write request that originates from the host device 220 to write to the respective memory channel 204, and a host read request that is received from the host device 220 to read from the respective memory channel 204. It is noted that system read requests (also called background read requests or non-host read requests) and system write requests are dispatched by a memory controller 202 to implement internal memory management functions including, but are not limited to, garbage collection, wear levelling, read disturb mitigation, memory snapshot capturing, memory mirroring, caching, and memory sparing. In some embodiments, each of a host write request and a host read request corresponds to a respective input/output (I/O) access operation. Alternatively, in some embodiments, each of a system read request, a system write request, a host write request, and a host read request corresponds to a respective input/output (I/O) access operation.

In some embodiments, in addition to the channel controllers 214, the controller 202 further includes a local memory processor 218, a host interface controller 222, an SRAM buffer 224, and a DRAM controller 226. The local memory processor 218 accesses the plurality of memory channels 204 based on the one or more queues 216 of memory access requests. In some embodiments, the local memory processor 218 writes into and read from the plurality of memory channels 204 on a memory block basis. Data of one or more memory blocks are written into, or read from, the plurality of channels jointly. No data in the same memory block is written concurrently via more than one operation. Each memory block optionally corresponds to one or more memory pages. In an example, each memory block to be written or read jointly in the plurality of memory channels 204 has a size of 16 KB (e.g., one memory page). In another example, each memory block to be written or read jointly in the plurality of memory channels 204 has a size of 64 KB (e.g., four memory pages). In some embodiments, each page has 16 KB user data and 2 KB metadata. Additionally, a number of memory blocks to be accessed jointly and a size of each memory block are configurable for each of the system read, host read, system write, and host write operations.

In some embodiments, the local memory processor 218 stores data to be written into, or read from, each memory block in the plurality of memory channels 204 in an SRAM buffer 224 of the controller 202. Alternatively, in some embodiments, the local memory processor 218 stores data to be written into, or read from, each memory block in the plurality of memory channels 204 in a DRAM buffer 228A that is included in memory device 240, e.g., by way of the DRAM controller 226. Alternatively, in some embodiments, the local memory processor 218 stores data to be written into, or read from, each memory block in the plurality of memory channels 204 in a DRAM buffer 228B that is main memory used by the processor module 102 (FIG. 1). The local memory processor 218 of the controller 202 accesses the DRAM buffer 228B via the host interface controller 222.

In some embodiments, the memory device 240 includes an integrity engine 230 (e.g., an LDPC engine) and registers 232, which include a plurality of registers or SRAM cells or flip-flops and are coupled to the integrity engine 230. The integrity engine 230 is coupled to the memory channels 204 via the channel controllers 214 and SRAM buffer 224. Specifically, in some embodiments, the integrity engine 230 has data path connections to the SRAM buffer 224, which is further connected to the channel controllers 214 via data paths that are controlled by the local memory processor 218. The integrity engine 230 is configured to verify data integrity and correct bit errors for each coding block of the memory channels 204.

In some embodiments, the memory system 200 includes an SSD having an logical-to-physical (L2P) address indirection table 250 that stores physical addresses for a set of logical addresses, e.g., a logical block address (LBA). In some embodiments, the L2P address indirection table 250 is stored in an L2P table cache 212 included in the controller 202. Alternatively, in some embodiments, the memory system 200 includes a DRAM buffer 228A, and the L2P address indirection table 250 is stored in the DRAM buffer 228A. The local memory processor 218 of the controller 202 accesses the DRAM buffer 228A via a DRAM controller 226.

Figure 3A:
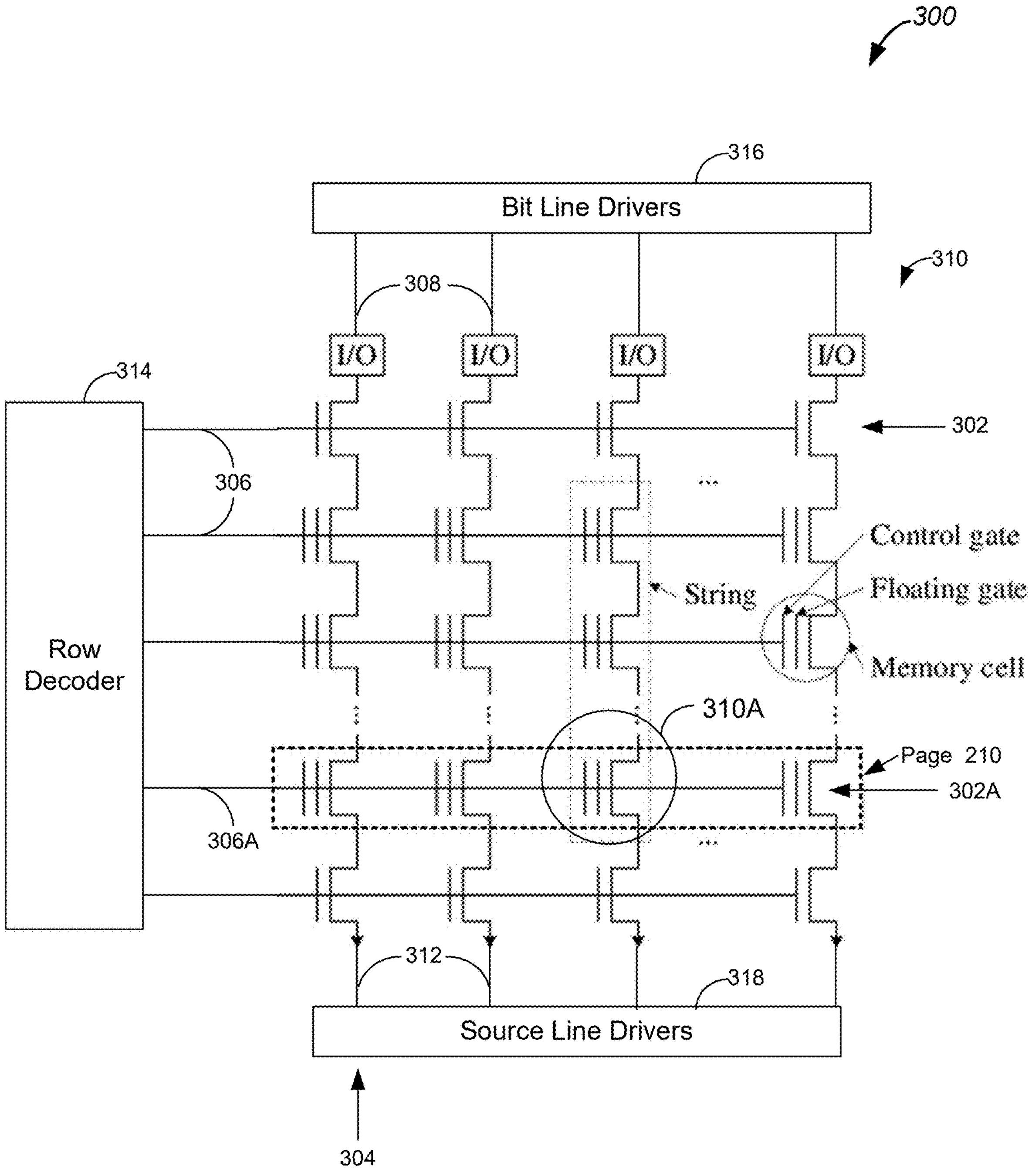
FIG. 3A is a schematic diagram of an example NAND-based memory device 300 including a drive circuit, in accordance with some embodiments.

FIG. 3A is a schematic diagram of an example NAND-based memory device 300 including a drive circuit, in accordance with some embodiments. The memory device 300 includes an array of memory cells 310 having a plurality of memory cells 310 arranged in a plurality of rows 302 and a plurality of columns 304, and each memory cell 310 is located at a respective intersection of a respective row 302 and a respective column 304. Each memory cell 310 is configured to be accessed via a word line 306, a bit line 308, and a source line 312. Each word line 306 is coupled to a set of memory cells 310 located on the respective row 302, and each pair of the bit line 308 and the source line 312 is coupled to a set of memory cells 310 located on the respective column 304. In some embodiments, each memory cell 310 can store two or more bits by differentiating between multiple charge levels, thereby allowing for higher data density. Different charge levels correspond to different data states, which may be enabled on, or extracted from, a memory cell 310, when different voltage levels are applied to the memory cell 310 for write or read. In other words, the memory device 300 corresponds to a non-SLC NAND flash memory chip (e.g., MLC SSD, TLC SSD, QLC SSD, PLC SSD). In some embodiments, the non-volatile memory is an X-level cell, where X is an integer greater than 5. In some embodiments, compared with an SLC memory chip, the non-SLC NAND flash memory chip increases storage capacity, and has more complex voltage management and wear on the memory cells 310. Further, in some embodiments, error correction is applied in the memory controller 202 (FIG. 2), allowing the memory cells 310 that store multiple data bits to provide a storage capacity reliably.

In some embodiments, the array of memory cells 310 is coupled to a row decoder 314, a bit line driver 316, and a source line driver 318. During a memory write process, the row decoder 314 selects a first row of memory cells 310 (e.g., corresponding to a memory page 210) via a first word line 306A. The first word line 306A is driven by a selection voltage, allowing current to flow through each memory cell 310 and change its state. More specifically, for each memory cell 310 on the selected row 302A, the respective bit line 308 and the respective source line 312 are driven to respective voltages to set the respective memory cell 310 to a respective data state corresponding to a target multi-bit data item to be stored into the respective memory cell 310. In some embodiments, for each unselected memory cell 310, a word line 306 coupled to the unselected memory cell 310 is driven by a non-selection voltage different from the selection voltage, allowing current to flow through the unselected memory cell 310 without change its data state.

In some embodiments, foggy programming and fine programming are two successive operations applied to write data to a memory page 210 including a memory cell 310A that stores two or more data bits. For example, the memory cell 310A includes a QLC memory cell and stores four bits of data, and the memory cell 310A can exist in one of sixteen possible states. The memory cell 310A is programmed to have a threshold voltage $V_{TH}$ corresponding to the one of the sixteen possible states. In some embodiments, a foggy programming operation includes a rough, coarse adjustment to the threshold voltage $V_{TH}$ of the memory cell 310A of the memory page 210, bringing the threshold voltage $V_{TH}$ within a broad target range and close to a target state. The foggy programming operation is relatively fast but not highly precise, and sets up the memory cell 310A for further refinement without immediately requiring high precision, thereby speeding up a memory write process. Further, in some embodiments, a fine programming operation follows the foggy programming operation, and includes a fine adjustment to the threshold voltage $V_{TH}$, fine-tuning the threshold voltage $V_{TH}$ of the memory cell 310A to the a target level required to represent the data being stored. During the fine programming operation, the threshold voltage $V_{TH}$ of the memory cell 310A is accurately set, reducing the risk of read errors and ensuring reliable data storage. Fine programming is slower and more meticulous than foggy programming, but is crucial for data accuracy and reliability of the memory cell 310A. Additionally, in some embodiments, a combination of foggy programming and fine programming results in a balance between programming speed and accuracy, when foggy programming allows for rapid progress and fine programming ensures that the data is stored correctly and can be reliably read back.

Figure 3B:
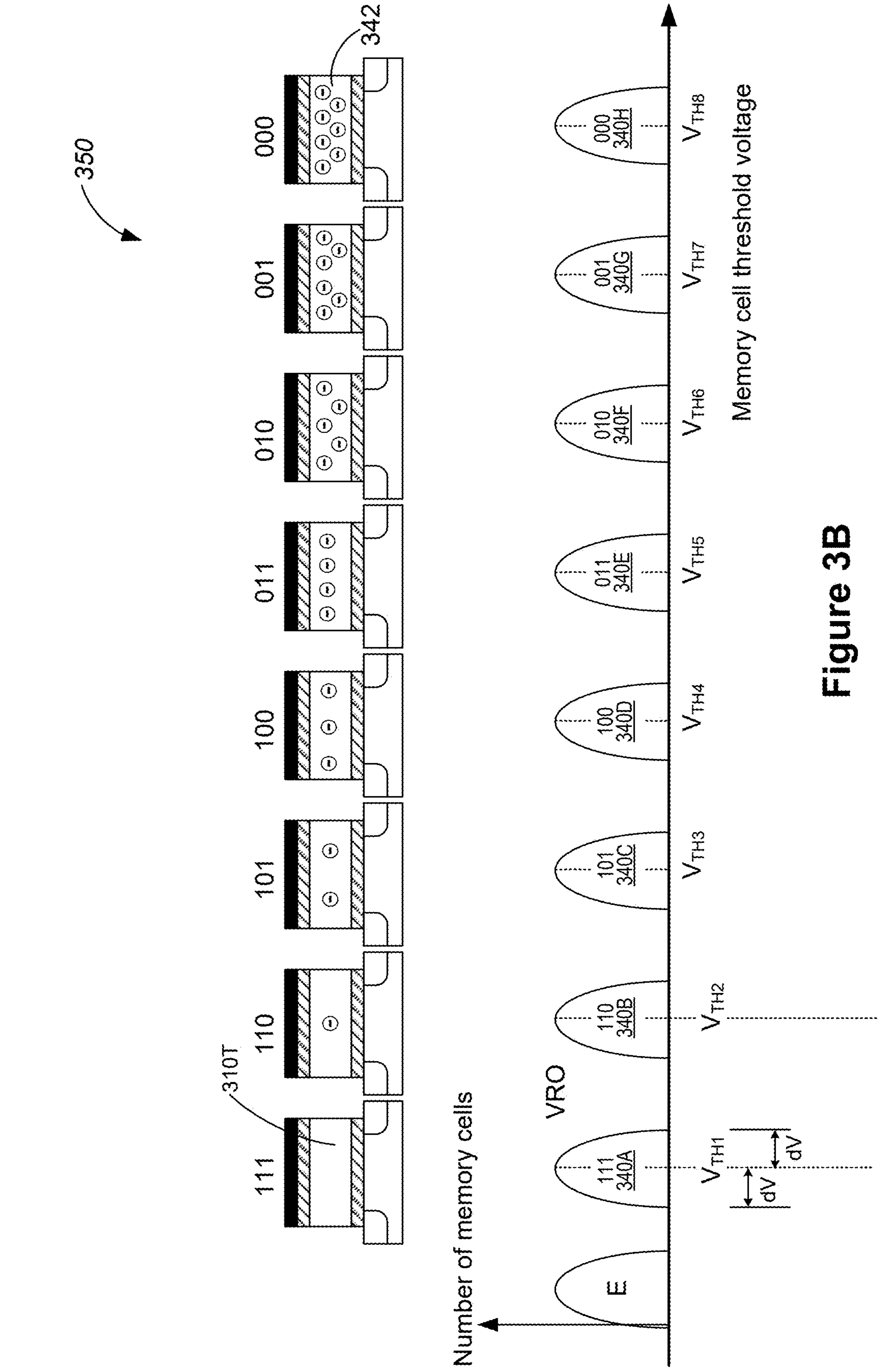
FIG. 3B illustrates an example memory cell threshold voltage probability distribution of a triple-level cell (TLC) memory cell, in accordance with some embodiments.

FIG. 3B illustrates an example memory cell threshold voltage probability distribution 350 of a TLC memory cell 310T, in accordance with some embodiments. The TLC memory cell 310T has a gate G, a source S, and a drain D. In accordance with a relationship between a current $I_G$ (e.g., flowing between the source S and the drain D) and a gate voltage $V_G$ applied on the gate G, each of eight data values "111," "110," "101," "100," "011," "010," "001," and "000" is stored in the TLC memory cell. The gate voltage $V_G$ has a threshold voltage $V_{TH}$, and the current $I_G$ is controlled based on the threshold voltage $V_{TH}$ (e.g., to be greater than a current threshold $I_{GTH}$). A value stored in the respective memory cell 310T has a respective threshold voltage $V_{TH}$. For example, the TLC memory cell 310T storing "111," "110," "101," "100," "011," "010," "001," or "000" has a threshold voltage $V_{TH1}$, $V_{TH2}$, $V_{TH3}$, $V_{TH4}$, $V_{TH5}$, $V_{TH6}$, $V_{TH7}$, or $V_{TH8}$, respectively.

The threshold voltage of the TLC memory cell 310T depends at least in part on a number of excess electrons existing in a charge storage film 342. In some embodiments, the lower the number of excess electrons in the charge storage film 342 is, the lower the threshold voltage is and the easier it is for the current $I_G$ to flow. In some embodiments, even if all of a plurality of TLC memory cells 310T of the memory device 240 store the same data, these memory cells 310T of the memory device 240 may differ in the numbers of excess electrons in the charge storage films 342 and their associated threshold voltages, which have a probability distribution (e.g., 340A for "111").

Referring to FIG. 3B, in some embodiments, the memory cells 310T of the memory device 240 have the same probability of storing "111," "110," "101," "100," "011," "010," "001," and "000." A number of the memory cells has eight peaks at the threshold voltages $V_{TH1}$, $V_{TH2}$, $V_{TH3}$, $V_{TH4}$, $V_{TH5}$, $V_{TH6}$, $V_{TH7}$, and $V_{TH8}$ corresponding to "111," "110," "101," "100," "011," "010," "001," and "000," respectively. The eight peak numbers of memory cells having the threshold voltages $V_{TH1}$ to $V_{TH8}$ are substantially equal to one another. Each peak number of memory cells drops below a threshold valley number or to zero within a respective deviation voltage dV on both sides of the respective threshold voltage, forming a threshold voltage probability distribution 340A, 340B, 340C, 340D, 340E, 340F, 340G, or 340H.

In some situations, during a read operation, the gate voltage $V_G$ is set to a readout voltage VRO, which is between two threshold voltage probability distributions (e.g., 340A for a first data "111" and 340B for a second data "110"). The threshold voltages $V_{TH1}$ of the memory cells storing the first data are lower than the readout voltage VRO, and their associated currents $I_G$ flow. Conversely, the threshold voltages $V_{TH2}$ of the memory cells storing the second data are higher than the readout voltage VRO, and their associated currents $I_G$ do not flow or are substantially low (e.g., smaller than the current threshold $I_{GTH}$).

Figure 3C:
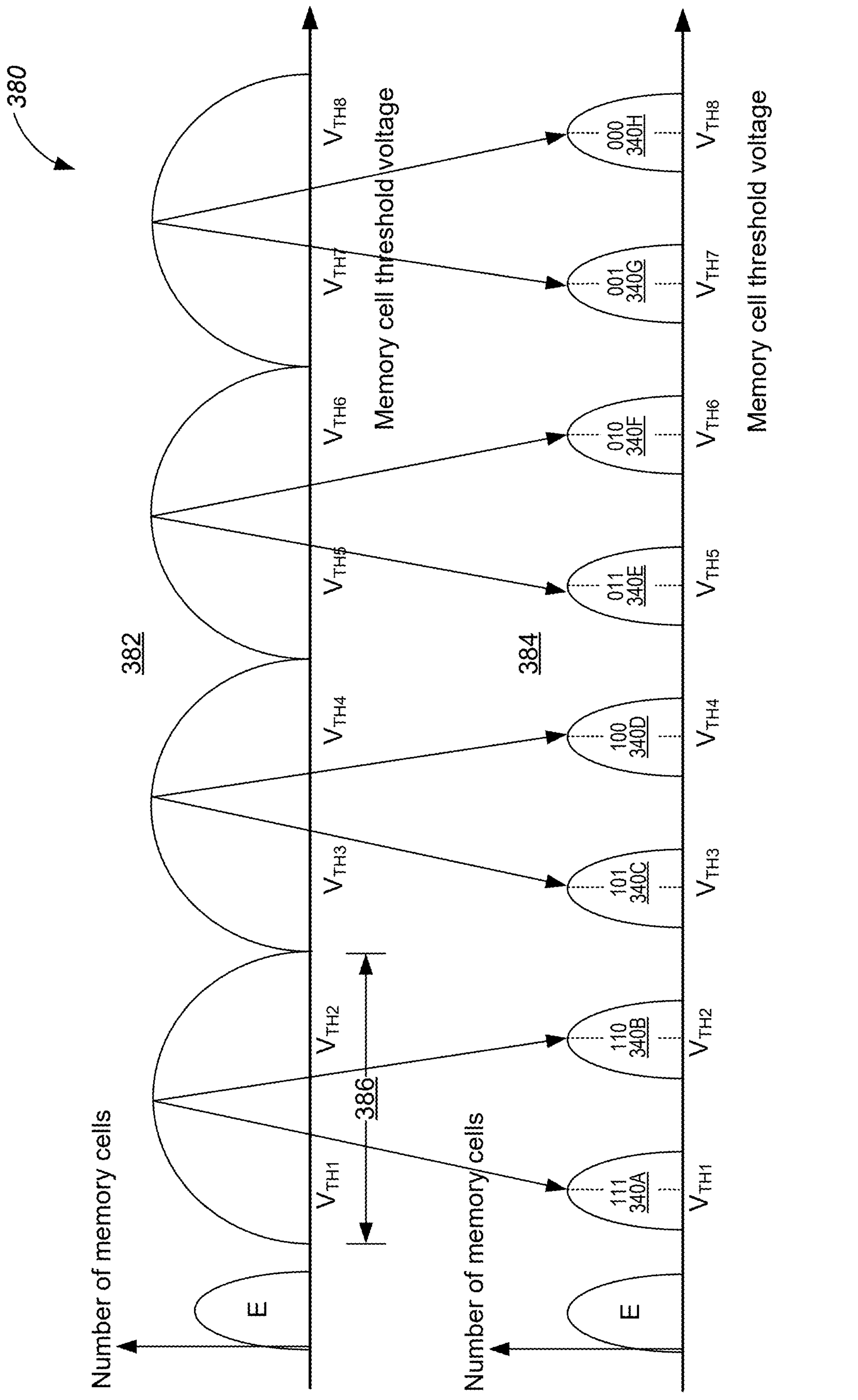
FIG. 3C illustrates an example two-stage memory write operation based on the threshold voltage probability distribution of the TLC memory cell shown in FIG. 3B, in accordance with some embodiments.

FIG. 3C illustrates an example two-stage memory write operation 380 based on the threshold voltage probability distribution 350 of the TLC memory cell 310T shown in FIG. 3B, in accordance with some embodiments. The memory write operation 380 includes a foggy programming operation 382 and a fine programming operation 384, which are implemented successively on the TLC memory cell 310T that stores two or more data bits. The TLC memory cell 310T is configured to store three bits of data and exist in one of eight possible states. The TLC memory cell 310T is programmed to have a threshold voltage $V_{TH}$ corresponding to the one of the eight possible states.

In some embodiments, the foggy programming operation 382 includes a rough, coarse adjustment to the threshold voltage $V_{TH}$ of the TLC memory cell 310T of the memory page 210, bringing the threshold voltage $V_{TH}$ within a broad target range close to a target state (e.g., range 386 close to states "111" and "110"). The foggy programming operation 382 is relatively fast but not highly precise, and sets up the TLC memory cell 310T for further refinement without immediately requiring high precision, thereby speeding up the memory write operation 380. Further, in some embodiments, the fine programming operation 384 follows the foggy programming operation 382, and includes a fine adjustment to the threshold voltage $V_{TH}$, fine-tuning the threshold voltage $V_{TH}$ of the TLC memory cell 310T to the target level required to represent the data being stored. During the fine programming operation 384, the threshold voltage $V_{TH}$ of the TLC memory cell 310T is accurately set, reducing the risk of read errors and ensuring reliable data storage. Fine programming 384 is slower and more meticulous than foggy programming 382, but is crucial for data accuracy and reliability of the TLC memory cell 310T. Additionally, in some embodiments, a combination of foggy programming 382 and fine programming 384 results in a balance between programming speed and accuracy, where foggy programming 382 allows for rapid progress, while fine programming 384 ensures that the data is stored correctly and can be reliably read back.

Figure 4:
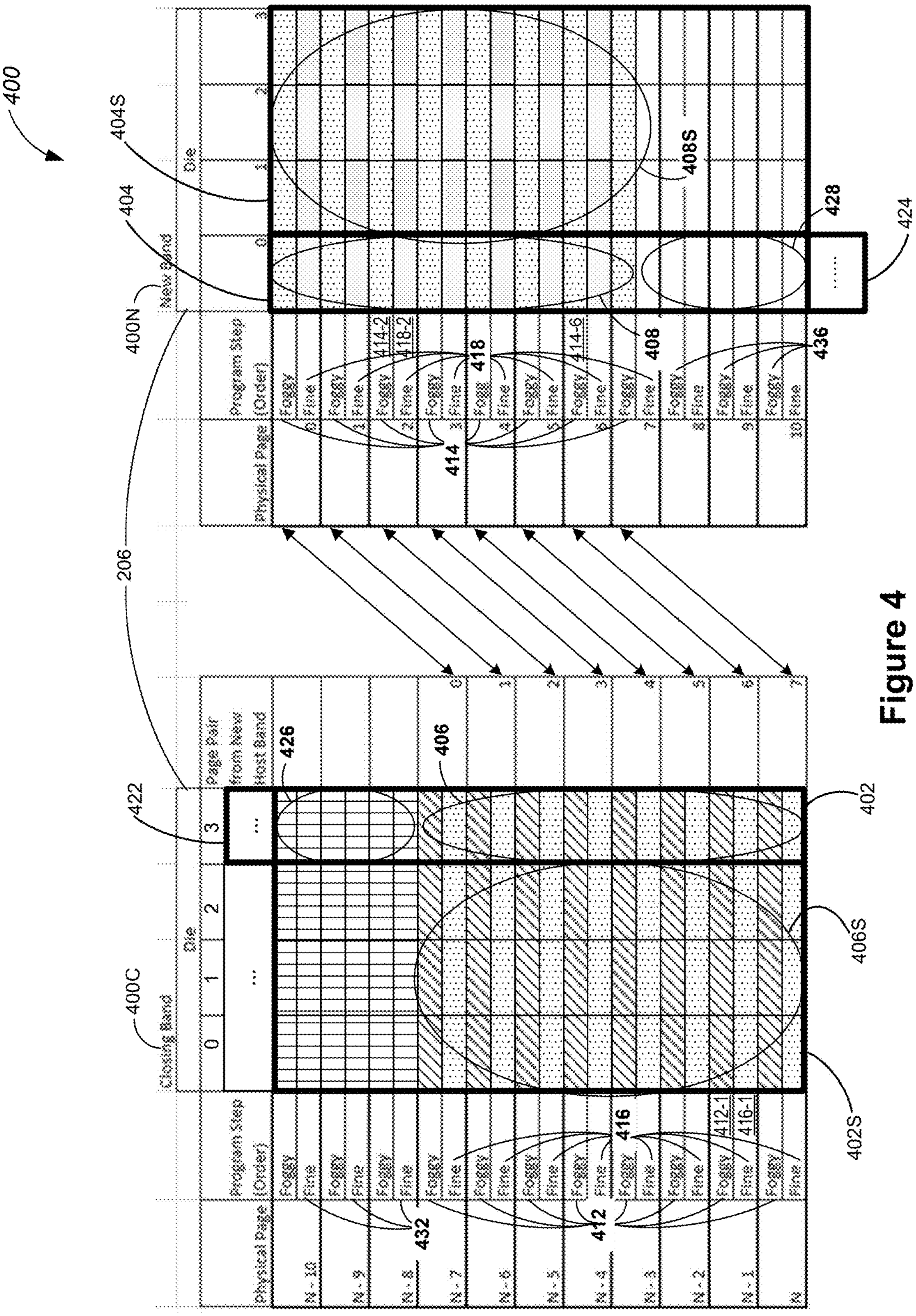
FIG. 4 is a schematic diagram of two memory bands written in an interleaving manner, in accordance with some embodiments.

FIG. 4 is a schematic diagram of two memory bands 400 written in an interleaving manner, in accordance with some embodiments. The two memory bands 400 include a first memory block 402 and a second memory block 404, respectively. Each memory block includes a plurality of memory pages (e.g., memory pages 210 in FIGS. 2 and 3A). Each memory page includes a plurality of memory cells (e.g., memory cells 310 in FIG. 3A) each of which is configured to store multiple data bits (e.g., 3 bits, 4 bits). In some embodiments, a memory system 200 includes non-volatile memory (e.g., memory channels 204) for storing data. The two memory bands 400 are included in the non-volatile memory. In some embodiments, the memory system 200 successively performs a first batch of foggy programming operations 412 on a plurality of first memory pages 406 located at an end of the first memory block 402 and opens the second memory block 404 having a plurality of second memory pages 408 located at a start of the second memory block 404. After the first batch of foggy programming operations 412, the memory system 200 alternatingly performs a first batch of fine programming operations 416 on the plurality of first memory pages 406 and performing a second batch of foggy programming operations 414 on the plurality of second memory pages 408.

In some embodiments, the first memory block 402 corresponds to at least one die 206 (e.g., Die 3 of a band 400C), which includes N memory pages (e.g., indexed as 0, 1, 2, . . . , N−2, N−1, and N, where N is a positive integer) addressed by N+1 word lines 306 (FIG. 3A). For example, an (N−1)-th memory page 406 is addressed by an (N−1)-th word line during the programming operations 412-1 or 416-1. The second memory block 404 also corresponds to at least one die 206 (e.g., Die 0 of a band 400N), which includes at least 11 memory pages (e.g., indexed as 0, 1, 2, 3, . . . , 10) addressed by 11 word lines 306. For example, a memory page 408 indexed as "2" is addressed by a second word line during the foggy programming operation 414-2.

In some embodiments, each first memory page 406 is uniquely associated with, and forms a page pair with, a respective second memory page 408. For example, the first memory pages 406 indexed as N−7, N−6, N−5, N−4, N−3, N−2, N−1, and N are associated with the second memory pages 408 indexed as 0, 1, 2, 3, 4, 5, 6, and 7, forming eight page pairs. Further, in some embodiments, for each first memory page 406, a respective one of the first batch of fine programming operations 416 is performed on the respective first memory page 406, and a respective one of the second batch of foggy programming operations 414 is performed on the respective second memory page 408, immediately after the respective one of the first batch of fine programming operations 416 and without being separated by a distinct foggy or fine programming operation. In an example, a fine programming operations 416-1 is performed on the respective first memory page 406, and a foggy programming operations 414-6 is performed on the respective second memory page 408, immediately after the fine programming operation 416-1 and without being separated by a distinct foggy or fine programming operation.

Alternatively, in some embodiments, for each second memory page 408, a respective one of the second batch of foggy programming operations 414 is performed on the respective second memory page 408. A respective one of the first batch of fine programming operations 416 is performed on the respective first memory page 406, immediately after the respective one of the second batch of foggy programming operations 414 and without being separated by a distinct foggy or fine programming operation. In an example, a foggy programming operations 414-6 is performed on the respective second memory page 408. A fine programming operations 416-1 is performed on the respective first memory page 406 immediately after the foggy programming operation 414-6 and without being separated by a distinct foggy or fine programming operation.

In some embodiments, when the memory system 200 performs the first batch of foggy programming operations 412, it writes data stored in a first buffer (e.g., a SRAM buffer 224) to the plurality of first memory pages 406. After the first batch of foggy programming operations 412 and before the second batch of foggy programming operations 414, the memory system 200 erases data to be stored in the plurality of first memory pages 406 from the first buffer. Further, in some embodiments, when the memory system 200 performs the first batch of fine programming operations 416, it writes data stored in a second buffer (e.g., a DRAM buffer 228A) to the plurality of first memory pages 406. By these means, the first buffer, which is fast and has a limited space, may be released before the first memory block 402 is completed and repurposed to facilitate data write and read operations in other memory blocks (e.g., the second memory block 404).

In some embodiments, the non-volatile memory of the memory system 200 is one of a single-level cell (SLC) solid state drive (SSD), a multi-level cell (MLC) SSD, a triple-level cell (TLC) SSD, a quad-level cell (QLC) SSD, and a penta-level cell (PLC) SSD. In some embodiments, the non-volatile memory is an X-level cell, where X is an integer greater than 5. Each memory cell is configured to be written with data via two successive programming operations including a respective foggy programming operation and a respective fine programming operation. The non-volatile memory may include a NAND flash memory or a NOR flash memory. More specifically, in some embodiments, the non-volatile memory of the memory system 200 includes a quad-level cell (QLC) solid state drive, and each QLC memory cell is configured to be written with data via two successive programming operations including a respective foggy programming operation followed by a respective fine programming operation. For example, the (N−1)-th memory page of the first memory block 402 is programmed with respective data successively using the foggy programming operation 412-1 and the fine programming operation 416-1.

In some embodiments, the first memory block 402 includes a plurality of preceding memory pages 426, and the first batch of foggy programming operations 412 are performed on the plurality of first memory pages 406 alternatingly with a preceding batch of fine programming operations 432 performed on the plurality of preceding memory pages 426. More details on the alternating programming operations performed on the memory pages 406 and 426 are discussed below with respect to FIG. 5A.

In some embodiments, the second memory block 404 includes a plurality of following memory pages 428. After the second batch of foggy programming operations 414, the memory system 200 alternatingly performs a second batch of fine programming operations 418 on the plurality of second memory pages 408 and a following batch of foggy programming operations 436 on the plurality of following memory pages 428. More details on the alternating programming operations performed on the memory pages 408 and 428 are discussed below with respect to FIG. 5B.

In some embodiments, the non-volatile memory of the memory system 200 further includes a preceding memory block 422 having a plurality of memory pages. The memory system 200 alternatingly performs fine programming operations on a set of memory pages located at an end of the preceding memory block 422 and foggy programming operations on a set of memory pages located at a start of the first memory block 402. In some embodiments, the non-volatile memory of the memory system 200 further includes a following memory block 424 having a plurality of memory pages. The memory system 200 alternatingly performs fine programming operations on a set of memory pages located at an end of the second memory block 404 and foggy programming operations on a set of memory pages located at a start of the first memory block 424.

In some embodiments, the non-volatile memory of the memory system 200 includes a memory die 206 (e.g., Die 0), and the first memory block 402 and the second memory block 404 are located on the same memory die 206. In some embodiments, the non-volatile memory of the memory system 200 includes a plurality of memory dies 206 (e.g., Dies 0-3), and the first memory block 402 and the second memory block 404 are located on two distinct dies of the plurality of memory dies 206. In some embodiments, each of the first memory block 402 and the second memory block 404 is distributed on a plurality of memory dies 206 (e.g., the same memory dies 206).

In some embodiments, the non-volatile memory of the memory system 200 includes a plurality of memory bands 400. Each memory band 400 is distributed on a plurality of memory dies 206 (e.g., Dies 0-3) and includes a plurality of respective memory pages on each memory die 206. The first memory block 402 and the second memory block 404 are included in two distinct memory bands 400. For example, the first memory block 402 belongs to a current memory band 400C (also called a closing band), and is the last memory block of the current memory band 400C before the current memory band 400C is closed. In other words, in some embodiments, the current memory band 400C is closed from write after the first batch of fine programming operations 416 are completed on the plurality of first memory pages 406. The second memory block 404 belongs to a next destination band 400N (also called a new band), which immediately follows the current memory band 400C, and is written data immediately after the next destination band 400N is open for write. The next memory band 400N is opened, after the foggy programming operations 412 are implemented on the memory pages 406 and before the fine programming operations 416 are implemented on the memory pages 406.

In some embodiments, a first memory band 400C (also called a current memory band and a closing band) includes the first memory block 402 and a first set of one or more memory blocks 402S. A second memory band 400N (also called a next destination band and a new band) includes the second memory block 404 and a second set of one or more memory blocks 404S. The memory system 200 performs a subset of the first batch of fine programming operations 416 on each of the first set of one or more memory blocks 402S and a subset of the second batch of foggy programming operations 414 performed on a respective one of the second set of one or more memory blocks 404 in an interleaving manner. Further, in some embodiments, each of the first set of one or more memory blocks 402S includes additional first memory pages 406S located at a respective end of the respective memory block 402S. Each of the second set of one or more memory blocks 404S includes additional second memory pages 408S located at a start of the respective memory block 404S. For each of the first set of one or more memory blocks 402S, the subset of the first batch of fine programming operations 416 is performed on the additional first memory pages 406S alternatingly with the subset of the second batch of foggy programming operations 414 performed on the additional second memory pages 408S of the respective one of the second set of one or more memory blocks 404S.

Stated another way, in some embodiments, the non-volatile memory of the memory system 200 includes a plurality of memory bands 400 (e.g., bands 400C and 400N). The first memory block 402 and the second memory block 404 may broadly refer to two distinct memory bands 400C and 400N, e.g., when the memory band 400C only includes the first memory block 402 and the memory band 400N only includes the second memory block 402 or when the first memory block 402 broadly includes memory blocks 402 and 402S and the second memory block 404 broadly includes memory blocks 404 and 404S.

Referring to FIG. 4, in some embodiments, the first memory block 402 corresponds to a single die 206 (e.g., Die 0 of the closing band 400C), and the first set of one or more memory blocks 402S corresponds to other distinct dies 206 (e.g., Dies 1-3 of the closing band 400C). Each die 206 includes N+1 memory pages (e.g., indexed as 0, 1, 2, . . . , N−2, N−1, and N) addressed by N+1 word lines 306 (FIG. 3A), and each of the N+1 word lines 306 corresponds to four distinct memory pages located on the four dies 206. In some embodiments, the four distinct memory pages are addressed concurrently by the same respective word line 306 for foggy programming or fine programming. For example, the memory blocks 402 and 402S include four (N−1)-th memory pages 406 and 406S, which are distributed on four dies 206 (e.g., Dies 0-3 of the closing band 400C) and may be addressed jointly by the same (N−1)-th word line during the programming operations 412-1 or 416-1.

In some embodiments, the second memory block 404 also corresponds to a single die 206 (e.g., Die 0 of the new band 400N), and the second set of one or more memory blocks 404S corresponds to other distinct dies 206 (e.g., Dies 1-3 of the new band 400N). Each die 206 includes at least 11 memory pages (e.g., indexed as 0, 1, 2, . . . , 9, and 10) addressed by 11 word lines 306 (FIG. 3A). Each of the 11 word lines 306 corresponds to four distinct memory pages 408 or 408S located on the four dies 206. In some embodiments, the four distinct memory pages are addressed concurrently by the same respective word line 306 for foggy programming or fine programming. For example, the memory blocks 404 and 404S include four second memory pages 408 and 408S, which are distributed on four dies 206 and addressed jointly by the same second word line during a programming operation 414-2 or 418-2.

In some embodiments, a memory access throughput is measured by a number of input/output operations per second (IOPS) corresponding to one or more queues of I/O access operations implemented by the memory system 200 in response to requests of a host device 220 (FIG. 2), and a variation of the memory access throughput is less than a throughput variation threshold. Stated another way, the memory access throughput is substantially stable. In an example, a write QoS is below 1 millisecond, and the IOP stability meets a requirement of being greater than 90% across a plurality of queue depth sweeps.

Figure 5A:
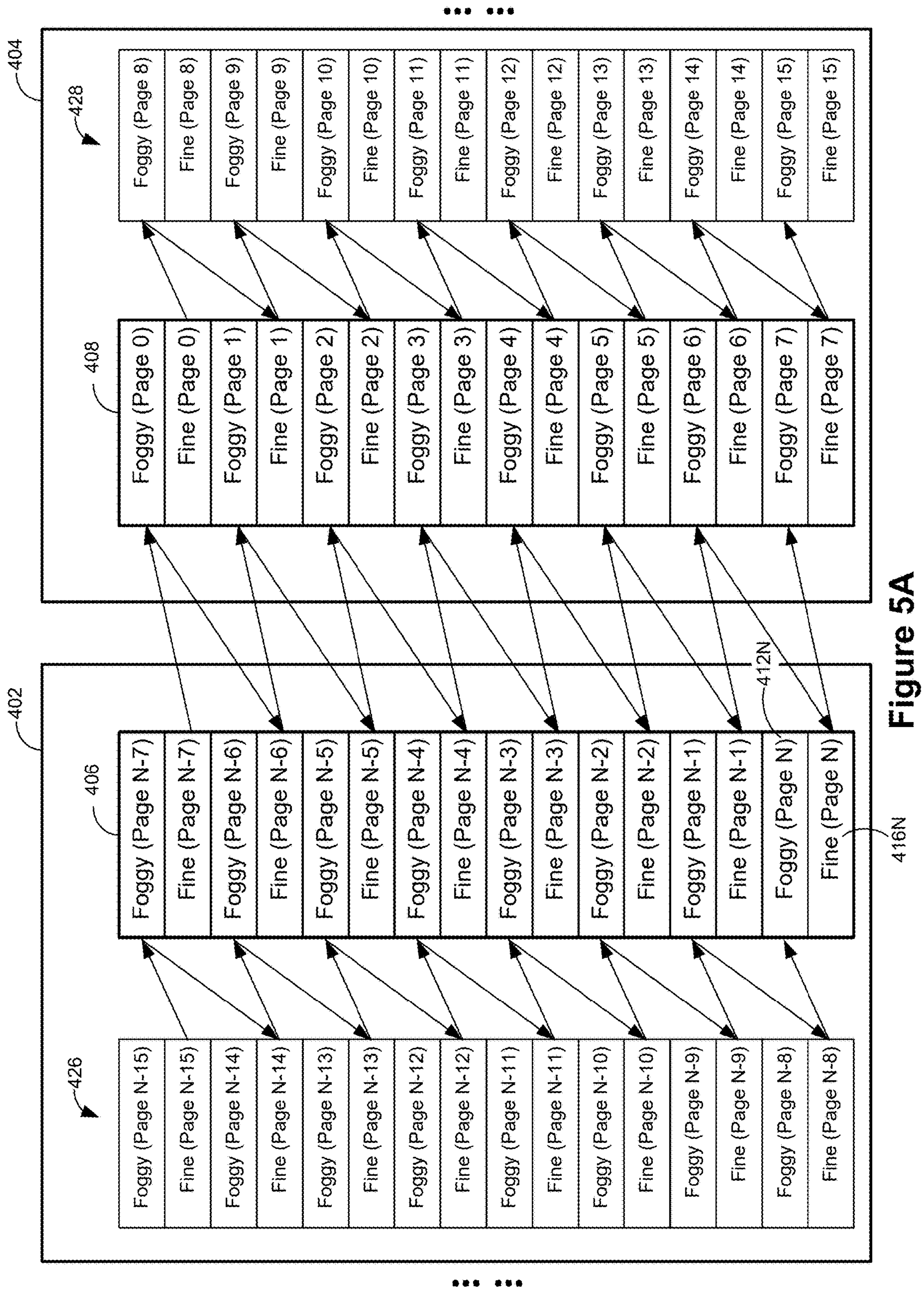
FIGS. 5A and 5B are schematic diagrams of two example memory blocks that are written in an interleaving manner, in accordance with some embodiments.
Figure 5B:
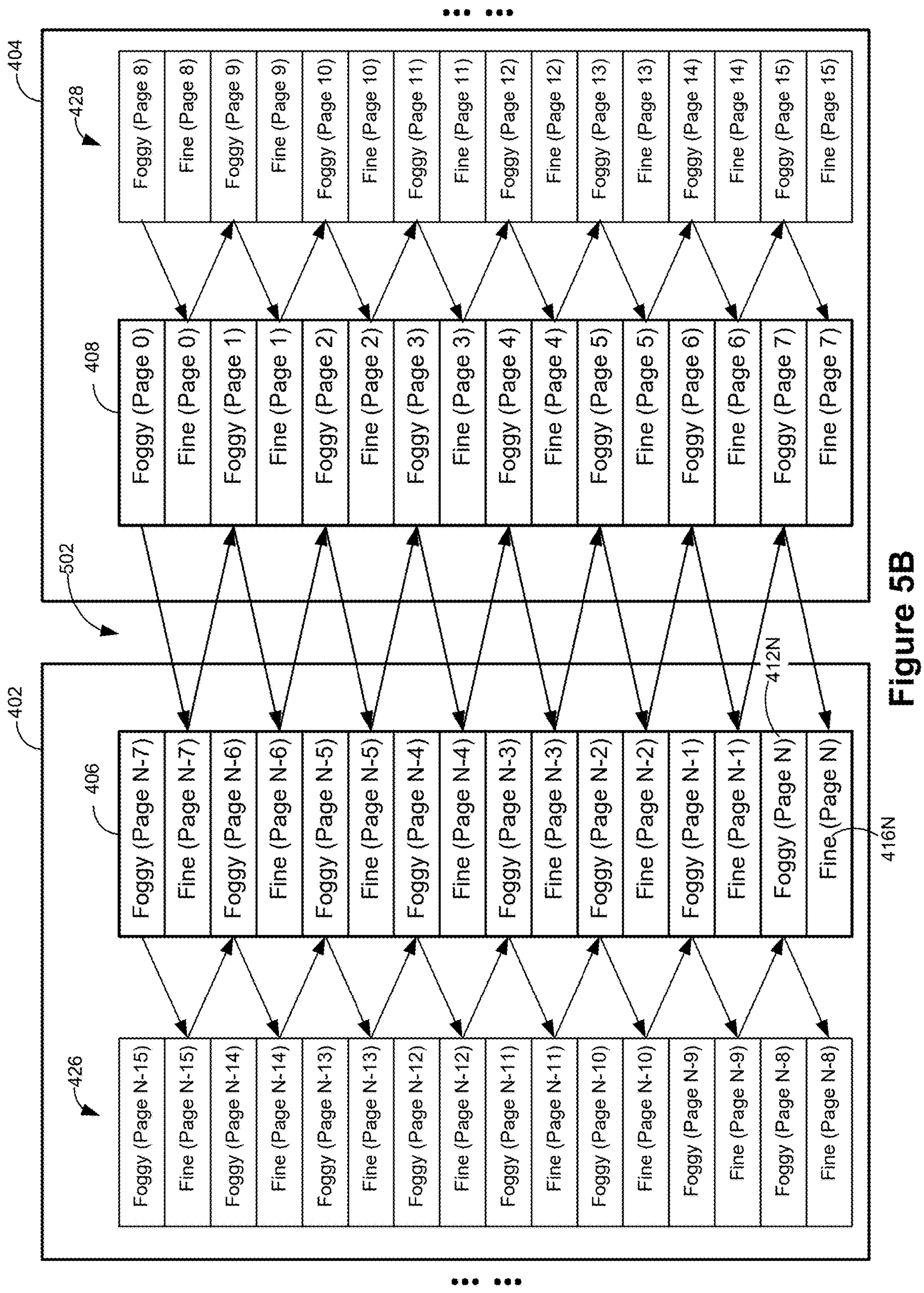

FIGS. 5A and 5B are schematic diagrams of two example memory blocks 402 and 404 that are written in an interleaving manner, in accordance with some embodiments. Each of the first memory block 402 and the second memory block 404 includes a plurality of memory pages. In an example, every 8 memory pages are grouped for foggy programming and fine programming. Referring to FIGS. 5A and 5B, pages N−15 to N−8 of the first memory block 402, pages N−7 to Page N of the first memory block 402, pages 0-7 of the second memory block 404, and pages 8-15 of the second memory block 404 form four groups. In some embodiments, the first memory block 402 is ended with the first memory pages 406, and the second memory block 404 is started with the second memory pages 408. Each first memory page 406 is uniquely associated with a respective second memory page 408. For example, the first memory pages 406 indexed as N−7, N−6, N−5, N−4, N−3, N−2, N−1, and N are associated with the second memory pages 408 indexed as 0, 1, 2, 3, 4, 5, 6, and 7, respectively. Alternatively, in some embodiments, a number of memory pages that are grouped for foggy or fine programming is distinct from 8.

In some embodiments (FIG. 5A), for each first memory page 406, a respective one of the first batch of fine programming operations 416 is performed on the respective first memory page 406, and a respective one of the second batch of foggy programming operations 414 is performed on the respective second memory page 408, after the respective one of the first batch of fine programming operations 416 and without being separated by a distinct foggy or fine programming operation. Alternatively, in some embodiments (FIG. 5B), for each second memory page 408, a respective one of the second batch of foggy programming operations 414 is performed on the respective second memory page 408. A respective one of the first batch of fine programming operations 416 is performed on the respective first memory page 406, after the respective one of the second batch of foggy programming operations 414 and without being separated by a distinct foggy or fine programming operation.

In some embodiments, after a foggy programming operation 412N is implemented on a last page (e.g., Page N) of the first memory block 402, the memory system 200 opens the second memory block 204 for programming. An ordered sequence of programming operations 502 is further performed in an interleaving manner on the first memory block 402 and the second memory block 404. The first memory block 402 is closed after the fine programming operation 416N is completed.

Referring to FIG. 5A, in an example, the ordered sequence of programming operations 502 implemented on the memory blocks 402 and 404 includes a fine programming operation on page N−7 of the first memory block 402, a foggy programming operation on page 0 of the second memory block 404, a fine programming operation on page N−6 of the first memory block 402, a foggy programming operation on page 1 of the second memory block 404, a fine programming operation on page N−5 of the first memory block 402, a foggy programming operation on page 2 of the second memory block 404, a fine programming operation on page N−4 of the first memory block 402, a foggy programming operation on page 3 of the second memory block 404, a fine programming operation on page N−3 of the first memory block 402, a foggy programming operation on page 4 of the second memory block 404, a fine programming operation on page N−2 of the first memory block 402, a foggy programming operation on page 5 of the second memory block 404, a fine programming operation on page N−1 of the first memory block 402, a foggy programming operation on page 6 of the second memory block 404, a fine programming operation on page N of the first memory block 402, and a foggy programming operation on page 7 of the second memory block 404. The first memory block 402 is closed after the fine programming operation 416N is completed, e.g., after the ordered sequence of programming operations 502 is completed.

Referring to FIG. 5B, in another example, the ordered sequence of programming operations 502 implemented on the memory blocks 402 and 404 includes a foggy programming operation on page 0 of the second memory block 404, a fine programming operation on page N−7 of the first memory block 402, a foggy programming operation on page 1 of the second memory block 404, a fine programming operation on page N−6 of the first memory block 402, a foggy programming operation on page 2 of the second memory block 404, a fine programming operation on page N−5 of the first memory block 402, a foggy programming operation on page 3 of the second memory block 404, a fine programming operation on page N−4 of the first memory block 402, a foggy programming operation on page 4 of the second memory block 404, a fine programming operation on page N−3 of the first memory block 402, a foggy programming operation on page 5 of the second memory block 404, a fine programming operation on page N−2 of the first memory block 402, a foggy programming operation on page 6 of the second memory block 404, a fine programming operation on page N−1 of the first memory block 402, a foggy programming operation on page 7 of the second memory block 404, and a fine programming operation on page N of the first memory block 402. The first memory block 402 is closed after the fine programming operation 416N is completed, e.g., after the ordered sequence of programming operations 502 is completed.

In some embodiments, the first memory block 402 further includes a plurality of preceding memory pages 426, and the first batch of foggy programming operations 412 (FIG. 4) are performed on the plurality of first memory pages 406 alternatingly with a preceding batch of fine programming operations performed on the plurality of preceding memory pages 426. Referring to FIGS. 5A and 5B, the foggy programming operations on pages N−7 to N and the fine programming operations on pages N−15 to N−8 are performed alternatingly (e.g., in an interleaving manner). In some embodiments (FIG. 5A), the foggy programming operations on pages N−7 to N and the fine programming operations on pages N−15 to N−8 are started with the fine programming operation on page N−15 and ended with the foggy programming operation 412N on page N. In some embodiments (FIG. 5B), the foggy programming operations on pages N−7 to N and the fine programming operations on pages N−15 to N−8 are started with the foggy programming operation on page N−7 and ended with the fine programming operation on page N−8.

In some embodiments, the second memory block 404 includes a plurality of following memory pages 428. After the second batch of foggy programming operations 414, the memory system 200 alternatingly performs a second batch of fine programming operations 418 on the plurality of second memory pages 408 and a following batch of foggy programming operations 436 on the plurality of following memory pages 428. Referring to FIGS. 5A and 5B, the fine programming operations on pages 0-7 and the foggy programming operations on pages 8 to 15 are performed alternatingly (e.g., in an interleaving manner). In some embodiments (FIG. 5A), the fine programming operations on pages 0-7 and the foggy programming operations on pages 8 to 15 and are started with the fine programming operation on page 0 and ended with the foggy programming operation on page 15. In some embodiments (FIG. 5B), the fine programming operations on pages 0-7 and the foggy programming operations on pages 8 to 15 are started with the foggy programming operation on page 8 and ended with the fine programming operation on page 7.

Figure 6:
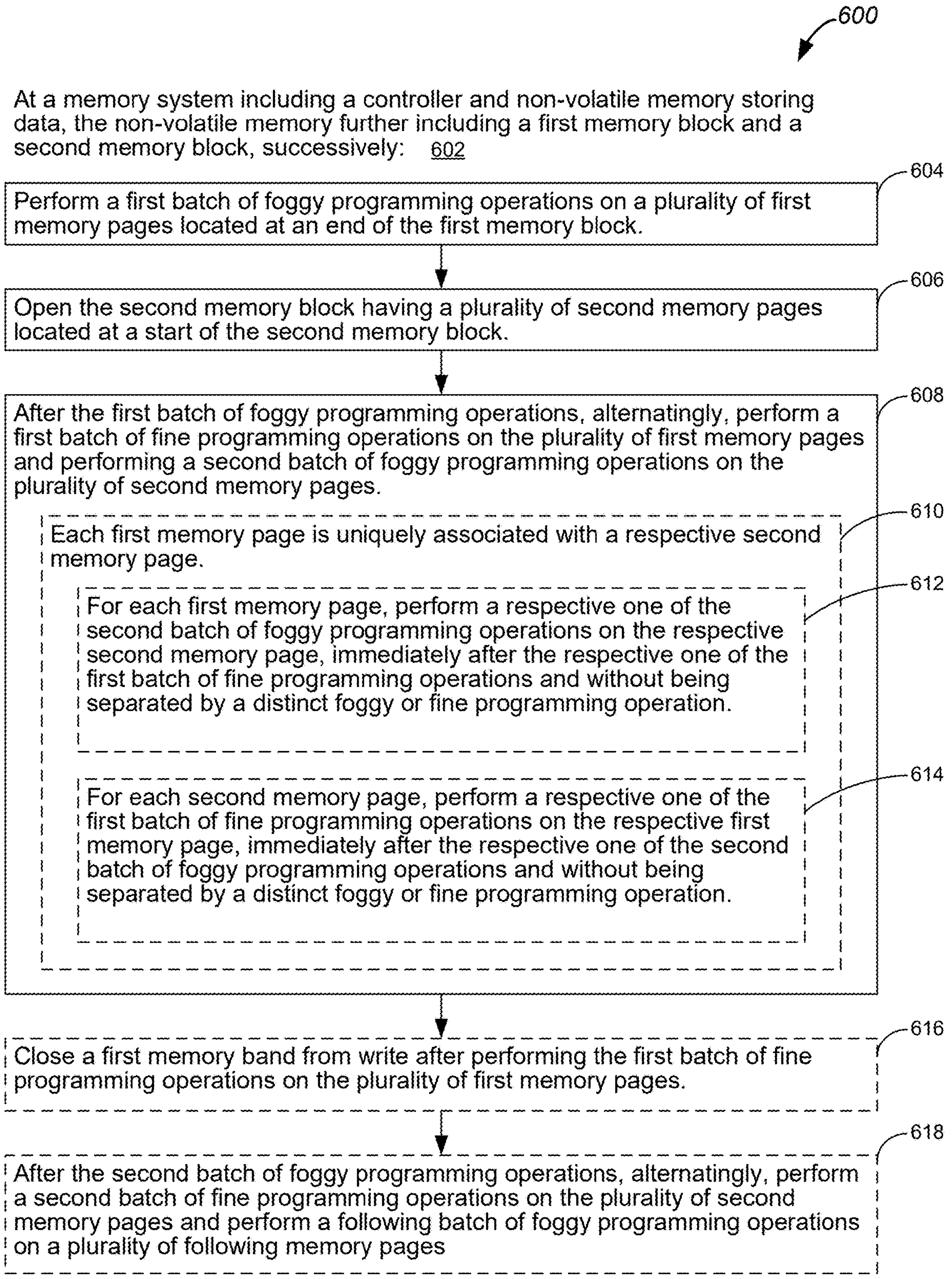
FIG. 6 is a flow diagram of an example method for implementing write operations on a memory system, in accordance with some embodiments.

FIG. 6 is a flow diagram of an example method 600 for implementing write operations on a memory system 200 having a first memory block 402 and a second memory block 404, in accordance with some embodiments. The method 600 is implemented (operation 602) at a memory system 200 for performs memory write operations. The memory system includes a controller 202 and non-volatile memory (e.g., memory channels 204A-204N in FIG. 2). The non-volatile memory further includes a first memory block 402 and a second memory block 404. The memory system 200 performs operations 604, 606, and 608 successively. The memory system 200 performs (operation 604) a first batch of foggy programming operations 412 on a plurality of first memory pages 406 located at an end of the first memory block 402, and opens (operation 606) the second memory block 404 having a plurality of second memory pages 408 located at a start of the second memory block 404. After the first batch of foggy programming operations 412, alternatingly, the memory system 200 performs (operation 608) a first batch of fine programming operations 416 on the plurality of first memory pages 406 and performs a second batch of foggy programming operations 414 on the plurality of second memory pages 408.

In some embodiments, each first memory page 406 is uniquely associated (operation 610) with a respective second memory page 408. For each first memory page 406, the memory system 200 performs a respective one of the first batch of fine programming operations 416 on the respective first memory page 406. The memory system 200 further performs (operation 612) a respective one of the second batch of foggy programming operations 414 on the respective second memory page 408, immediately after the respective one of the first batch of fine programming operations 416 and without being separated by a distinct foggy or fine programming operation.

In some embodiments, each first memory page 406 is uniquely associated with a respective second memory page 408. For each second memory page 408, the memory system 200 performs a respective one of the second batch of foggy programming operations 414 on the respective second memory page 408. The memory system 200 also performs (operation 614) a respective one of the first batch of fine programming operations 416 on the respective first memory page 406, immediately after the respective one of the second batch of foggy programming operations 414 and without being separated by a distinct foggy or fine programming operation.

In some embodiments, the memory system 200 performs the first batch of foggy programming operations 412 by writing data stored in a first buffer (e.g., a SRAM buffer 224 in FIG. 2) to the plurality of first memory pages 406. After the first batch of foggy programming operations 412 and before the second batch of foggy programming operations 414, the memory system 200 erases data to be stored in the plurality of first memory pages 406 from the first buffer. Further, in some embodiments, the memory system 200 performs the first batch of fine programming operations 416 by writing data stored in a second buffer (e.g., a DRAM buffer 228A) to the plurality of first memory pages 406.

In some embodiments, the non-volatile memory of the memory system 200 includes a quad-level cell (QLC) solid state drive, and each QLC memory cell of the non-volatile memory is configured to be written with data via two successive programming operations including a respective foggy programming operation (e.g., operation 412-1 in FIG. 4) followed by a respective fine programming operation (e.g., operation 416-1 in FIG. 4).

In some embodiments, the non-volatile memory is one of a single-level cell (SLC) solid state drive (SSD), a multi-level cell (MLC) SSD, a triple-level cell (TLC) SSD, a quad-level cell (QLC) SSD, and a penta-level cell (PLC) SSD. In some embodiments, the non-volatile memory is an X-level cell, where X is an integer greater than 5.

In some embodiments, the first memory block 402 further includes a plurality of preceding memory pages 426 (FIG. 4), and the first batch of foggy programming operations 412 are performed on the plurality of first memory pages 406 alternatingly with a preceding batch of fine programming operations 432 performed on the plurality of preceding memory pages 426.

In some embodiments, the second memory block 404 includes a plurality of following memory pages 428. After the second batch of foggy programming operations 414, the memory system 200 alternatingly performs (operation 618) a second batch of fine programming operations 418 on the plurality of second memory pages 408 and a following batch of foggy programming operations 436 on the plurality of following memory pages 428.

In some embodiments, the non-volatile memory includes a memory die. The first memory block 402 and the second memory block 404 are located on the memory die (e.g., the same substrate of the memory die).

In some embodiments, the non-volatile memory includes a plurality of memory bands 400 each of which is distributed on a plurality of memory dies 206 (e.g., Dies 0-3 in FIG. 4) and includes a plurality of respective memory pages 210 on each memory die 206. The first memory block 402 and the second memory block 404 are included in two distinct memory bands. Each memory page 210 of a respective memory band 206 is addressed by a word line 306 that also addresses a respective memory page of each memory band of a remainder of the plurality of memory bands 400.

In some embodiments, a first memory band 400C includes the first memory block 402, and a second memory band 400N includes the second memory block 404. The memory system 200 closes (operation 616) the first memory band 400C from write after performing the first batch of fine programming operations 416 on the plurality of first memory pages 406. The second memory block 404 is opened when the second memory band 400C is opened for write.

In some embodiments, the non-volatile memory includes a plurality of memory bands 400 each of which is distributed on a plurality of memory dies 206 and includes a plurality of respective memory pages 210 on each memory die 206. The first memory block 402 and the second memory block 404 are two distinct memory bands 400N and 400C, respectively.

In some embodiments, a first memory band 400C includes the first memory block 402 and a first set of one or more memory blocks 402S. A second memory band 400N includes the second memory block 404 and a second set of one or more memory blocks 404S. The memory system 200 performs a subset of the first batch of fine programming operations 416 on each of the first set of one or more memory blocks 402S and a subset of the second batch of foggy programming operations 414 on a respective one of the second set of one or more memory blocks 404S alternatingly (e.g., in an interleaving manner).

Further, in some embodiments, each of the first set of one or more memory blocks 402S includes additional first memory pages 406S located at a respective end of the respective memory block 402S. Each of the second set of one or more memory blocks 404S includes additional second memory pages 408S located at a start of the respective memory block 404S. For each of the first set of one or more memory blocks 402S, the subset of the first batch of fine programming operations 416 is performed on the additional first memory pages 406S alternatingly with the subset of the second batch of foggy programming operations 414 performed on the additional second memory pages 408S of the respective one of the second set of one or more memory blocks 404S. Additionally, for each of the first memory pages 406 of the first memory block 402, the respective first memory page 406 may be addressed with a common word line 306 with respective additional first memory pages 406S of the first set of one or more memory blocks 402S, and written by a respective subset of the first batch of fine programming operations 416 jointly with the respective additional first memory pages 406S of the first set of one or more memory blocks 402S. For each of the second memory pages 408 of the second memory block 404, the respective second memory page 406 is addressed with a respective word line 306 with respective additional second memory pages 408S of the second set of one or more memory blocks 404S, and written by a respective subset of the first batch of foggy programming operations 414 jointly with the respective additional second memory pages 408S of the second set of one or more memory blocks 404S.

In some embodiments, a memory access throughput is measured by a number of IOPS corresponding to one or more queues of I/O access operations implemented by the memory system 200 in response to requests of a host device 220 (FIG. 3), and a variation of the memory access throughput is less than a throughput variation threshold.

In some embodiments, the second memory block 404 is opened before the first memory block 402 is closed. Such early destination band opening supports uniformly interleave foggy-fine programming during host write band transitions. Write QoS is not severely impacted. In some situations, charge-trap QLC SSDs (e.g. CPRQLC) complies write QoS and IOP stability requirements. In an example, the write QoS is below 1 millisecond, and the IOP stability meets a requirement of being greater than 90% across queue depth sweeps.

In some embodiments, a first number (e.g., 9) of programming operations on an NAND memory block (e.g., the second memory block 404) are foggy programming operations 414 (FIG. 4). At that point, the memory system 200 interleaves fine program operations 416 with the foggy programming operations 414 to complete programming of the first memory block 402. As the memory system 200 gets to the end of the closing band 400C, the last batch of operations are done as fine programming operations 416. The fine programming operations 416 are not actually programming any new host data, and host performance may drop. Foggy programming operations 412 may complete earlier than the fine programming operations 416, since the operations 412 have a faster programming time than the operations 416. At a band crossing boundary (e.g., of the closing band 400C), the host 220 may see a large drop in performance as the memory system 200 completes the fine programming operations 416 followed by a large jump in performance as a new band 400N is started. In some embodiments, buffering is used based on the amount of word lines of data to be written to the new band 400N.

In some embodiments, a bus analyzer is applied to analyze commands going to an SSD backend. When a sequential write workload may be executed on an SSD drive, the bus analyzer examines the address and program type (e.g., foggy programming, fine programming) and infers one or more of an NAND topology, band sizes, and back-end activity. In some situations, the SSD drive runs a low queue depth (e.g., includes a small number of IO requests that are waiting to be processed), and has a 100% write workload. The method 600 protects the memory system 200 from periodic IOPs stability swings or egregious write latencies. Additionally, in some embodiments, a band size is known when the bus analyzer examines addresses (write destination bands) and program type (e.g., foggy programming, fine programming). The memory system 200 may determine whether a new band is opened and is being foggy written while the previous band is being closed with fine programs.

Memory is also used to store instructions and data associated with the method 600, and includes high-speed random access memory, such as DRAM, SRAM, DDR RAM, or other random access solid state storage devices; and, optionally, includes non-volatile memory, such as one or more magnetic disk storage devices, one or more optical disk storage devices, one or more flash storage devices, or one or more other non-volatile solid state storage devices. The memory, optionally, includes one or more storage devices remotely located from one or more processing units. Memory, or alternatively the non-volatile memory within memory, includes a non-transitory computer readable storage medium. In some embodiments, memory, or the non-transitory computer readable storage medium of memory, stores the programs, modules, and data structures, or a subset or superset for implementing method 600.

Each of the above identified elements may be stored in one or more of the previously mentioned storage devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, the memory, optionally, stores a subset of the modules and data structures identified above. Furthermore, the memory, optionally, stores additional modules and data structures not described above.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Additionally, it will be understood that, although the terms "first," "second," etc. may be used herein to describe various elements, these elements should not be limited by these terms. These terms are only used to distinguish one element from another.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

What is claimed is:

1. A method for implement memory write operations, comprising:

at a memory system including a controller and non-volatile memory storing data, the non-volatile memory further including a first memory block and a second memory block, successively:

performing a first batch of foggy programming operations on a plurality of first memory pages that are located at an end of the first memory block;

opening the second memory block having a plurality of second memory pages that are located at a start of the second memory block; and after the first batch of foggy programming operations, alternatingly, performing a first batch of fine programming operations on the plurality of first memory pages and performing a second batch of foggy programming operations on the plurality of second memory pages, wherein a memory access throughput is measured by a number of input/output operations per second (IOPS) corresponding to one or more queues of I/O access operations implemented by the memory system in response to requests of a host device, and a variation of the memory access throughput is less than a throughput variation threshold.

2. The method of claim 1, wherein each first memory page is uniquely associated with a respective second memory page, and the method further comprises:

for each first memory page, performing a respective fine programming operation of the first batch of fine programming operations on the respective first memory page; and performing the respective foggy programming operation of the second batch of foggy programming operations on the respective second memory page, immediately after the respective fine programming operation of the first batch of fine programming operations and without being separated by a distinct foggy or fine programming operation.

3. The method of claim 1, wherein each first memory page is uniquely associated with a respective second memory page, and the method further comprises:

for each second memory page, performing the respective foggy programming operation of the second batch of foggy programming operations on the respective second memory page; and performing a respective next fine programming operation of the first batch of fine programming operations on the respective first memory page, immediately after the respective foggy programming operation of the second batch of foggy programming operations and without being separated by a distinct foggy or fine programming operation.

4. The method of claim 1, wherein:

performing the first batch of foggy programming operations further includes writing data stored in a first buffer to the plurality of first memory pages; and the method further comprises, after the first batch of foggy programming operations and before the second batch of foggy programming operations, erasing data to be stored in the plurality of first memory pages from the first buffer.

5. The method of claim 3, wherein performing the first batch of fine programming operations further includes writing data stored in a second buffer to the plurality of first memory pages.

6. The method of claim 1, wherein the non-volatile memory includes a quad-level cell (QLC) solid state drive, and each QLC memory cell of the non-volatile memory is configured to be written with data via two successive programming operations including a respective foggy programming operation followed by a respective fine programming operation.

7. The method of claim 1, wherein the non-volatile memory is one of a single-level cell (SLC) solid state drive (SSD), a multi-level cell (MLC) SSD, a triple-level cell (TLC) SSD, a quad-level cell (QLC) SSD, and a penta-level cell (PLC) SSD.

8. The method of claim 1, wherein the first memory block further includes a plurality of preceding memory pages, and the first batch of foggy programming operations are performed on the plurality of first memory pages alternatingly with a preceding batch of fine programming operations performed on the plurality of preceding memory pages.

9. The method of claim 1, wherein the second memory block includes a plurality of following memory pages, the method further comprising:

after the second batch of foggy programming operations, alternatingly, performing a second batch of fine programming operations on the plurality of second memory pages and performing a following batch of foggy programming operations on the plurality of following memory pages.

10. The method of claim 1, wherein the non-volatile memory includes a memory die, and the first memory block and the second memory block are located on the memory die.

11. The method of claim 1, wherein:

the non-volatile memory includes a plurality of memory block groups each of which is distributed on a plurality of memory dies and includes a plurality of respective memory pages on each memory die; and the first memory block and the second memory block are included in two distinct memory block groups.

12. The method of claim 11, wherein a first memory block group includes the first memory block, and a second memory block group includes the second memory block, the method further comprising:

closing the first memory block group from write after performing the first batch of fine programming operations on the plurality of first memory pages;

wherein the second memory block is opened when the second memory block group is opened for write.

13. The method of claim 1, wherein:

the non-volatile memory includes a plurality of memory block groups each of which is distributed on a plurality of memory dies and includes a plurality of respective memory pages on each memory die; and the first memory block and the second memory block are two distinct memory block groups.

14. The method of claim 1, wherein:

a first memory block group includes the first memory block and a first set of one or more memory blocks;

a second memory block group includes the second memory block and a second set of one or more memory blocks; and the method further comprises:

performing a subset of the first batch of fine programming operations on each of the first set of one or more memory blocks and a subset of the second batch of foggy programming operations performed on a respective one of the second set of one or more memory blocks in an interleaving manner.

15. The method of claim 14, wherein:

each of the first set of one or more memory blocks includes additional first memory pages located at a respective end of the respective memory block;

each of the second set of one or more memory blocks includes additional second memory pages located at a start of the respective memory block; and for each of the first set of one or more memory blocks, the subset of the first batch of fine programming operations is performed on the additional first memory pages alternatingly with the subset of the second batch of foggy programming operations performed on the additional second memory pages of the respective one of the second set of one or more memory blocks.

16. A memory system, comprising:

a controller;

non-volatile memory storing data, the non-volatile memory further including a first memory block and a second memory block; and memory storing one or more programs for execution by the controller, the one or more programs further comprising instructions for successively:

performing a first batch of foggy programming operations on a plurality of first memory pages that are located at an end of the first memory block;

opening the second memory block having a plurality of second memory pages that are located at a start of the second memory block; and after the first batch of foggy programming operations, alternatingly, performing a first batch of fine programming operations on the plurality of first memory pages and performing a second batch of foggy programming operations on the plurality of second memory pages;

wherein a memory access throughput is measured by a number of input/output operations per second (IOPS) corresponding to one or more queues of I/O access operations implemented by the memory system in response to requests of a host device, and a variation of the memory access throughput is less than a throughput variation threshold.

17. The memory system of claim 16, wherein each first memory page is uniquely associated with a respective second memory page, and the one or more programs further comprise instructions for:

for each first memory page, performing a respective fine programming operation of the first batch of fine programming operations on the respective first memory page; and performing the respective foggy programming operation of the second batch of foggy programming operations on the respective second memory page, immediately after the respective fine programming operation of the first batch of fine programming operations and without being separated by a distinct foggy or fine programming operation.

18. A non-transitory computer-readable storage medium, storing one or more programs for execution by one or more processors, the one or more programs further comprising instructions for:

at a memory system including non-volatile memory storing data, the non-volatile memory further including a first memory block and a second memory block, successively:

performing a first batch of foggy programming operations on a plurality of first memory pages that are located at an end of the first memory block;

opening the second memory block having a plurality of second memory pages that are located at a start of the second memory block; and after the first batch of foggy programming operations, alternatingly, performing a first batch of fine programming operations on the plurality of first memory pages and performing a second batch of foggy programming operations on the plurality of second memory pages, including for each of a plurality of first word lines, selecting a respective second word line for a respective foggy programming operation after selecting the respective first word line for a respective fine programming operation;

wherein a memory access throughput is measured by a number of input/output operations per second (IOPS) corresponding to one or more queues of I/O access operations implemented by the memory system in response to requests of a host device, and a variation of the memory access throughput is less than a throughput variation threshold.

19. The non-transitory computer-readable storage medium of claim 18, wherein each first memory page is uniquely associated with a respective second memory page, and the one or more programs further comprise instructions for:

for each second memory page, performing the respective foggy programming operation of the second batch of foggy programming operations on the respective second memory page; and performing a respective next fine programming operation of the first batch of fine programming operations on the respective first memory page, immediately after the respective foggy programming operation of the second batch of foggy programming operations and without being separated by a distinct foggy or fine programming operation.

* * * * *